Oct. 16, 1956     W. McVITTIE     2,766,702
ROTARY FLUID MOTOR OR PUMP
Filed Sept. 4, 1952     2 Sheets-Sheet 1

INVENTOR.
William McVittie
BY
Popp and Sommer
ATTORNEYS.

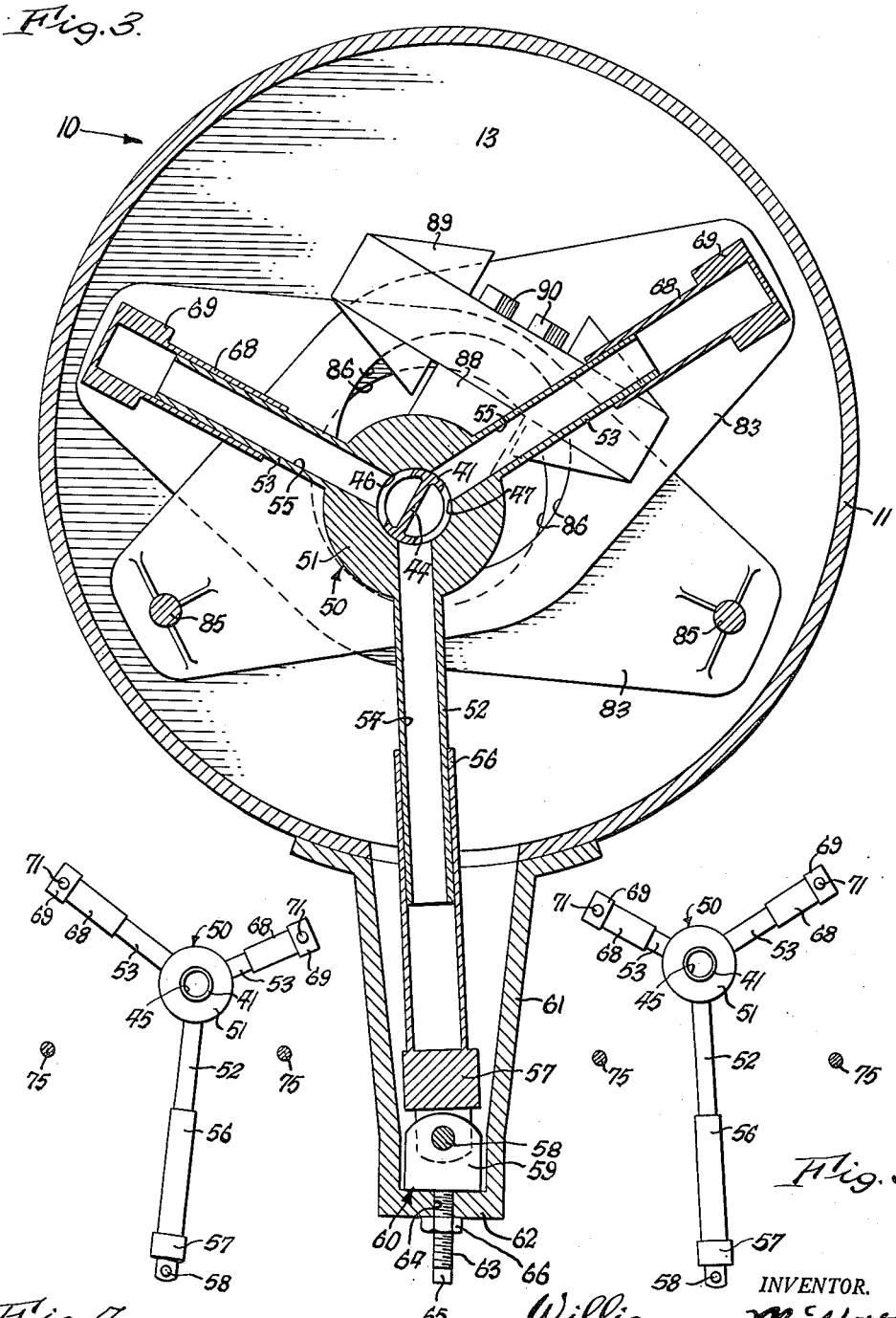

United States Patent Office 2,766,702
Patented Oct. 16, 1956

2,766,702

ROTARY FLUID MOTOR OR PUMP

William McVittie, Niagara Falls, N. Y.; Alice E. McVittie, executrix of said William McVittie, deceased, assignor to Arthur R. MacVittie, Gauley Bridge, W. Va., and Russell L. MacVittie, Marietta, Ohio Application September 4, 1952, Serial No. 307,939

10 Claims. (Cl. 103—159)

This invention relates to a rotary fluid motor or pump and more particularly to such a device which can be used as a motor, as a pump, or as a brake mechanism in driving or braking machine parts or in supplying fluid under pressure for such purposes.

One of the principal objects of the invention is to provide a rotary fluid motor, pump or brake mechanism which is highly efficient in the forward and reverse transmission of power and also in the transmission and absorption of energy in braking.

Another object is to provide such a mechanism which is of extremely simple and low cost construction but which is rugged and which will stand up under conditions of severe and constant use without getting out of order or requiring repairs.

Another object is to provide such a mechanism which is very compact and which, in particular, can be used for driving and braking various kinds of auxiliary equipment in mobile machinery.

Another object is to provide such a mechanism on which the pump and generator units can be arranged at a distance from one another.

Another object is to provide such a mechanism which is readily controlled with very little manual effort.

Another object is to provide such a mechanism which is applicable to light and heavy loads and which is applicable to slow and high speed uses.

Another object is to provide such a mechanism which is light in weight.

Another object is to provide such a mechanism in which the relatively movable contacting parts are adequately protected at all times by oil thereby to avoid wear even when, as in continued braking, a heavy load is imposed for a protracted period of time.

Another object is to provide such a rotary fluid motor or pump in which the fluid is adequately sealed against escape.

Another object of the invention is to provide such a rotary fluid motor or pump in which extremely fine tolerances are not required.

Another object is to provide such a rotary fluid motor or pump which has a minimum number of essential parts, particularly moving parts.

Another aim is to provide such a rotary fluid pump or motor which has no springs or small, moving frictional parts such as small friction shoes.

Other objects and advantages of the invention will appear from the following description and drawings in which:

Fig. 3 is a transverse section taken generally on line 3—3, Fig. 1 and showing one position of the parts.

Fig. 4 is a diagrammatic view, similar to Fig. 3, and showing a succeeding position of the parts.

Fig. 5 is a view similar to Fig. 4 and showing a further succeeding position of the parts.

Figures 1, 2:
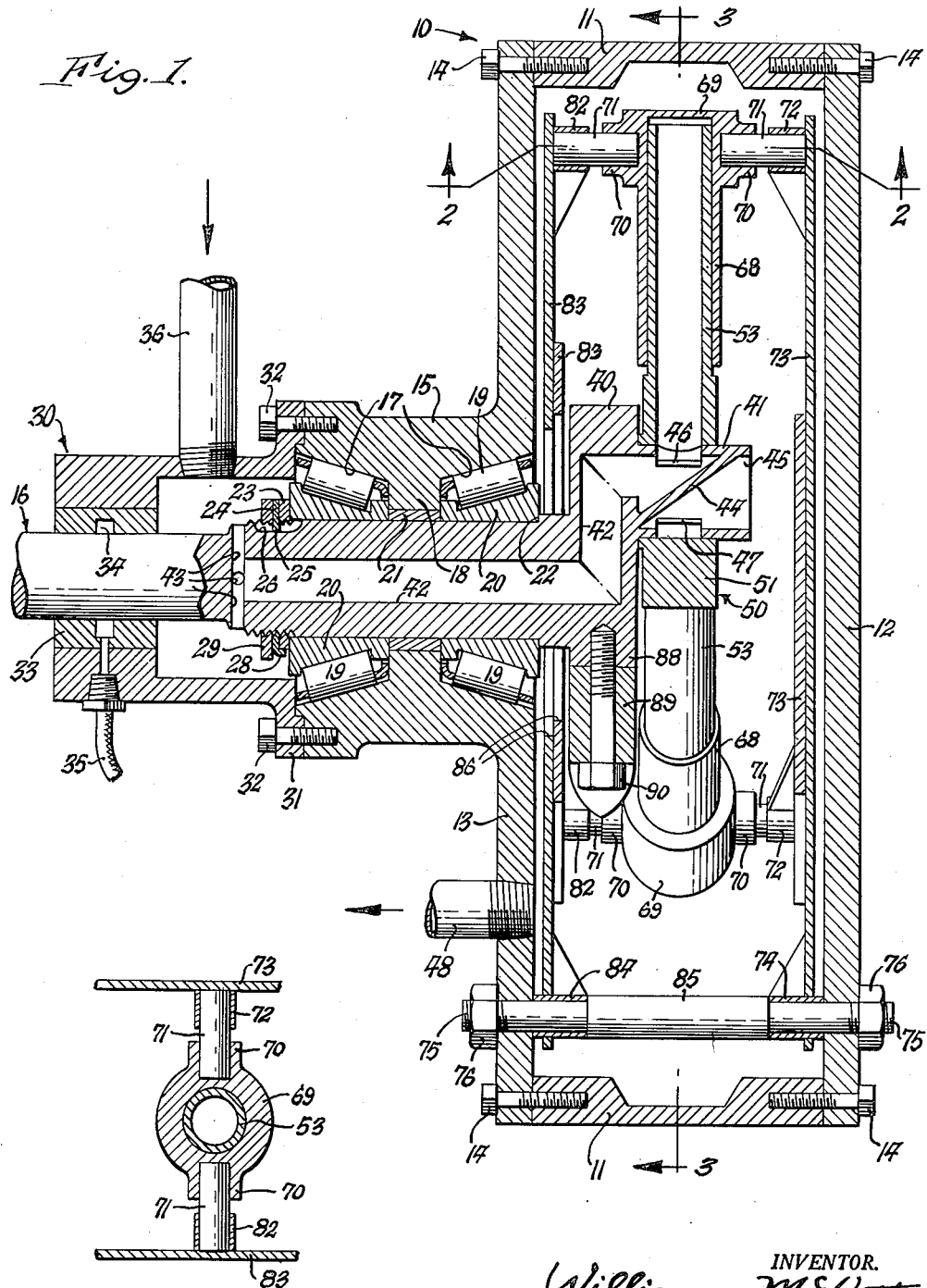
Fig. 1 is a longitudinal section through a rotary fluid motor or pump embodying the present invention, the section being taken through the axis of the crank shaft forming part of the mechanism.
Fig. 2 is a fragmentary section taken generally on line 2—2, Fig. 1.

The rotary fluid motor or pump of the present invention is shown as including a support in the form of a cylindrical, relatively shallow housing indicated generally at 10 and shown as having a cylindrical peripheral wall 11 to which circular end heads 12, 13 can be removably secured, as by screws 14. The end head 12 is shown as unprovided with openings and the end head 13 as provided with a hub 15 in which is journalled a crank shaft 16.

Any suitable bearings can be provided for journalling the crank shaft 16 in the hub 15, the hub 15 being shown as provided for this purpose with inwardly converging conical faces 17 leading to a radially inwardly projecting collar 18 and on which conical face roller bearings 19 roll. Each group of bearings rolls against an inner race 20 on the crank shaft 16 and which races are separated by the inwardly projecting collar 18 of the hub. An oil seal 21 is interposed between these races as well as between the inwardly projecting collar 18 and the crank shaft 16 to prevent escape of a high pressure oil past the roller bearings 19. One race 20 bears against an annular shoulder 22 on the crank shaft within the housing 10 and the opposite race 20 is secured to the crank shaft 16 by a nut 23. This nut is held against rotation by a washer 24 having a key 25 movable along an axial keyway 26 provided in the crank shaft 16, this washer also having a finger 28 extending over and engaging a flat on the periphery of the nut 23. The washer 24 is retained against the nut 23 by a lock nut 29.

A high pressure case, indicated generally at 30, is secured to the hub 15 although it will be understood that this high pressure case becomes the low pressure exhaust housing when the flow of fluid through the unit is reversed. This high pressure case is shown as being in the form of a cup having a radially outwardly projecting flange 31 at its rim and which flange is secured, as by screws 32, to the end of the hub 15 of the housing 10. The high pressure case 30 is provided with a coaxial bearing 33 for the crank shaft 16 and in order to prevent the leakage of high pressure fluid past this bearing 33 this bearing is annularly grooved, as at 34, in the surface contacting the crank shaft 16 and this groove is connected to a drain line 35 through which the fluid can be returned to a reservoir (not shown) for reuse. The high pressure fluid for driving the mechanism is shown as admitted to the high pressure case 30 through a fluid inlet line 36.

The crank shaft is shown as having an integral crank 40 and crank pin 41, both the crank and crank pin being housed within the housing 10. The crank shaft 16 is also shown as having a central passage 42 one end of which is connected by radial bores 43 with the interior of the high pressure case 30. The passage 42 continues along the crank 40 and crank pin 41 to a diagonal partition 44 which separates the passage 42 from the open end 45 of the crank pin 41. The passage 42 communicates with an exterior intake port 46 through the side of the crank pin 41 and this crank pin 41 is provided with an opposite exterior exhaust port 47 which communicates with the open end 45 of the crank pin 41 and hence with the interior of the housing 10. The spent fluid is returned from the housing 10 through a return line 48 to a tank or reservoir (not shown) for reuse.

A piston block, indicated generally at 50, is shown as rotatably mounted on the crank pin 41. This piston block is shown as having a cylindrical central hub or block 51 journalled on the crank pin 41 and as having three integral hollow or tubular pistons radiating therefrom. Of these the piston 52 is an anchoring piston and the other two pistons are designated at 53, these pistons 52, 53 being shown as evenly spaced at 120° apart. The bore 54 of the anchoring piston 52 extends from its open outer end to the periphery of the crank pin 41 as do the bores 55 of the pistons 53. The inner ends of these bores 54, 55 thereby form internal ports in the block 51 facing the crank pin 41 and arranged to be brought into communication with the exterior ports 46, 47 as the crank shaft rotates. The only distinction of the anchor piston 52 over the other pistons 53 is that it is longer.

The anchoring piston 52 is shown as being telescopically fitted in the open end of an anchor cylinder 56. The opposite or outer end of this cylinder is closed by a block or head 57 which can be integral therewith and which is shown as connected by a pivot pin 58 with the ears 59 of an adjustable anchoring bracket 60. The pin 58 extends parallel with the crank shaft 16. The anchoring cylinder 56 works in a radial extension neck 61 of the housing 10 and which extension neck has a head 62 at its outer end. The bracket 60 is provided with a threaded stem 63 fixed thereto and which works in a threaded opening 64 in the end head 62. The outer end of this threaded stem 63 is preferably squared, as indicated at 65, to receive a wrench and the threaded stem 65 is locked in any position of adjustment by a lock nut 66 bearing against the head 62.

Each of the other two pistons 53 is telescopically fitted into the open end of a cylinder 68. The outer end of each of these cylinders 68 is closed by an end head 69 having a pair of opposite bosses 70 extending laterally therefrom in a direction parallel with the crank shaft 16. As best shown in Fig. 2 each of these bosses 70 has fixed therein a swivel pin 71 each pair of these swivel pins 71 being coaxial and parallel with the crank shaft 16. On the side of the pistons and cylinders remote from the hub 15 each swivel pin 71 is journalled in the bearing 72 of a shackle 73. Each shackle 73 is in the form of an elongated flat plate and at its opposite end has a bearing 74. Each bearing 74 is mounted on an anchoring bolt 75 which extends through the end heads 12 and 13 of the housing 10. Each bolt 75 can be secured by nuts 76 and each bolt 75 is located on the side of the casing 10 opposite the cylinder head 69 with which it is connected.

Each swivel pin 71, on the side of the piston and cylinder structure adjacent the hub 15, is journalled in a bearing 82 at the outer end of a shackle 83. The opposite end of each shackle 83 is provided with a bearing 84 which is journalled on a corresponding one of the anchoring bolts 75. A tubular spacer 85 is shown as embracing each anchoring bolt 75 and as interposed between the bearings 74, 84 of the shackles 73, 83 respectively. The shackles 83, of course, are required to embrace the crank shaft 16 and for this purpose, as best shown in Fig. 3, are provided with large central holes 86 which not only receive the crank shaft 16 but also permit the required oscillation of the shackles 83. Since the shackles 73 are beyond the crank shaft 16, no such holes 86 are required for these shackles 73.

In order to balance the crank shaft 40, within the housing 10 a boss 88 is provided on the side of the crank shaft opposite its crank 40 and to this boss is secured a counterweight 89, as by screws 90.

In the operation of the unit as above described, it will be assumed that hydraulic fluid under pressure is supplied through the inlet line 36 to the high pressure case 30. This fluid passes through the radial bores 43 into the central passage 42 of the crank shaft. From this passage the fluid under pressure passes through the inlet port 46 into that hollow piston which is in its bottomed position. As shown in Figs. 1 and 3 this piston is that piston 53 at the upper left hand side of the drawing. This fluid passes through this hollow piston 53 and into the corresponding cylinder 68 thereby to expand this piston and cylinder with reference to each other and hence to move this piston and the piston block 50 in a corresponding direction. The movement of the piston block 50 in this direction rotates the crank pin 41 and its crank 40 counterclockwise as viewed in Fig. 3.

At this time it will be noted that the other piston 53 and the anchor piston 52 are in communication with the exhaust port 47. Accordingly the piston block 50 is not locked against such counterclockwise movement under the influence of the driving piston 53 since fluid is free to escape from the other cylinder 68 and from the anchor cylinder 56 through the exhaust port 47. The spent fluid so escaping from the exhaust port 47 escapes from the open end 45 of the crank pin 41 into the low pressure housing 10. From this housing the spent fluid returns through the line 48 to a reservoir (not shown) for reuse.

As the crank 40 and crank pin 41 continue to so rotate counterclockwise as viewed in Fig. 3 the intake port 46 passes toward a position out of register with the left hand hollow piston 53 and into register with the hollow anchor piston 52. At the same time the crank 40 is moving this anchor piston 52 toward its bottomed position. When this anchor piston 52 reaches its bottomed position the intake port 46 comes into register with the anchor piston 52 and hence fluid pressure is admitted through the anchor piston 52 so as to expand the anchor piston and cylinder 52, 56 relative to each other and to continue the counterclockwise rotation of the crank pin 41 and crank 40. This position of the parts is illustrated in Fig. 4 and at the time of introduction of fluid under pressure into the anchor cylinder and anchor piston 56, 52, the exhaust port 47 comes into register with the bores 55 of the other two cylinders 53. Accordingly such counterclockwise rotation of the crank 40 and crank pin 41 is not impeded by restricted movement of the pistons 53 which are at this time connected to exhaust and discharge through the open end 45 of the crank pin 41 into the casing 10 and thence through the spent fluid return line 48 to a reservoir (not shown) for reuse.

In the same manner the intake port 46 passes out of register with the bore 54 of the anchor piston 52 and into register with the upper right hand piston 53 as viewed in Fig. 3. As this intake port 46 comes into register with the bore 55 of this upper right hand hollow piston 53 the exhaust port 47 comes into register with the bores 55 and 54 of the other two pistons 53, 52. At this time the upper right hand piston 53 has bottomed and hence the introduction of fluid pressure through this piston 53 into its cylinder 68 serves to expand this piston and cylinder and hence continue the counterclockwise rotation of the crank pin 41, and crank 40. This position of the parts is shown in Fig. 5 and at this time the fluid being forced out of the upper left hand cylinder 68 and the anchor cylinder 56 is escaping through the exhaust port 47 and open end 45 of the crank shaft to the interior of the housing 10 and thence through the spent fluid return line to the storage reservoir.

This cycle of operation is continued as long as fluid under pressure is supplied through the inlet line 36.

It will particularly be noted that the pistons 52 and 53 are integral rigid extensions of the piston block 50 and that the swinging or oscillation of at least all but one of the cylinders at the outer ends of these rigid radial pistons, in a direction laterally of the crank shaft, is necessary to permit orbital movement of the piston block 50 with its rigid pistons around the major axis of the crank shaft. This movement of the outer ends of the cylinders is provided by the shackles 73, 83 and the pivotal anchorage 58 for the anchor cylinder 56. Thus, in such orbital movement of the piston black 50 with its fixed pistons, its position is positively determined by the pivotal anchorage of one of the cylinders, this being the anchor cylinder 56 which is anchored to the pivot pin 58 directly to the support or housing 10. However the outer ends of the other pistons 53 and their cylinders 68 necessarily travel in an arcuate path as the piston block 50 revolves in the orbit of the crank pin 41. This arcuate movement of the outer end of each of the rigid pistons 53 and its cylinder 68 is accommodated by the shackles 73 and 83 which, through their anchorage to the pins 75 at a point diametrically opposite the swivel pins 71, when the pistons 53 are in line with these pins 75, 71, permit the necessary swinging movement of the outer or closed ends of the cylinders 68 and at the same time hold these cylinders against longitudinal movement under the pressure of the fluid therein. It will also be noted that these shackles 73, 83, are at all times under pure tension so that it is unnecessary to provide any bulky structure for these shackles and they can be in the form of the simple plates and bearings as shown. Since at all times these shackles are immersed in fluid and since such fluid would be a lubricating oil it is also unnecessary to make any special provision for lubricating the bearings of any of these parts or any of the other parts.

At the right hand side, as viewed in Fig. 1, the shackles 73 can be in the form of simple plates but at the other or left hand side the shackles 83 necessarily embrace the crank shaft 16 and since they are required to oscillate they are provided with the relatively large holes 86 which accommodate such oscilaltion without interference from the crank shaft.

It will also be noted that while adequate provision is made for journalling the crank shaft 16 in the hub 15 through the two pairs of roller bearings 19, the escape of high pressure fluid from the high pressure case 30 to the low pressure or exhaust housing 10 is adequately prevented by the oil seal 21. This seal is equally effective when the pressures are reversed, that is, when the fluid under pressure is admitted at 48 and discharged at 36.

In this connection it will be understood, of course, that as a fluid motor the device will work in reverse. Thus if fluid under pressure is applied to the line 48 and returned through the line 36 the unit will operate in exactly the same manner as described except that the flow of fluid will be in reverse with the housing 10 now the high pressure case and with the case 30 now the low pressure or spent fluid return housing.

It will also be seen that the device will work as effectively as a pump as it does as a motor. Thus by applying mechanical power to the crank shaft 16 and driving the crank 40 and crank pin 41 counterclockwise as viewed in Fig. 3, fluid will be drawn in through the line 36 and discharged through the line 48. Upon reversing the rotation of the crank shaft 16 fluid will be drawn in through the line 48 and discharged through the line 36.

It will also be seen that the apparatus as above described can be used as a hydraulic brake. Thus with power applied to the crank shaft 16 rotating it in either direction, a braking torque can be applied to this crank shaft by the simple expedient of restricting the flow of fluid through either the supply line or the exhaust line.

It will be particularly noted that the structure of the hydraulic fluid motor, pump, or brake forming the subject of the present invention is extremely simple, rugged and low in cost and at the same time operates with high efficiency. In particular it will be noted that there are no springs or small rubbing parts such as are usually necessary in devices of this character. As previously indicated the simplicity of the present unit essentially flows from the use of a piston or cylinder block journalled on an orbitally moving crank pin and having rigid radially extending pistons or cylinders and by having all but one of the members cooperating with these pistons or cylinders connected by simple shackles to points of the containing housing diametrically opposite their connections with these cooperating members.

The invention is not to be construed as limited to the specific embodiment as shown but is to be accorded full range of equivalents comprehended by the accompanying claims.

I claim:

1. A rotary fluid motor or pump, comprising a series of radially disposed piston members, a series of radially dispose dcylinder members having open ends in which said piston members are severally slidingly fitted to be expanded and contracted with reference to each other, a support, a crank shaft journalled in said support and having a crank pin radially offset from the longitudinal axis of the crank shaft, a block journalled on said crank pin and connected with the adjacent inner ends of one series of said piston and clyinder members, a plurality of shackles severally pivotally connected at one end to the outer end of at least all but one of the other series of piston and cylinder members to swing transversely of said crank shaft, a pivotal connection between the other end of each of said shacles and said support, each of said last pivotal connections being located at the side of said crank shaft remote from said one end of the corresponding shackle, a pair of opposite fluid lines, and valve means cutting off each cylinder from one fluid line and connecting each cylinder with another fluid line when the corresponding piston member is approximately fully in its cylinder member, said valve means also cutting off each cylinder from said another fluid line and connecting each cylinder with said one fluid line when the corresponding piston member is approximately fully projected the maximum extent from its cylinder member.

2. A structure as set forth in claim 1 wherein said valve means includes passages provided in said crank pin.

3. A structure as set forth in claim 1 wherein said shackles are arranged in pairs with each pair so pivotally connected to the outer end of a corresponding member of said other series of piston and cylinder members through a pair of generally coaxial swivel pins projecting from opposite sides of said corresponding member and projecting generally parallel with said crank shaft.

4. A structure as set forth in claim 1 wherein certain of said shackles have central openings through which said crank shaft extends.

5. A structure as set forth in claim 1 wherein said support is in the form of a fluid tight housing in which said shackles and the crank and crank pin of said crank shaft are housed.

6. A structure as set forth in claim 1 wherein said support is in the form of a fluid tight housing in which said shackles and the crank and crank pin of said crank shaft are housed, wherein one of said fluid lines is connected with said housing and communicates with the interior of said housing, and wherein said valve means includes passages provided in said crank pin and said fluid also passes through the interior of said housing and said last fluid line.

7. A structure as set forth in claim 6 wherein one of said passages is in communication with said interior of said casing and the other passage is in communication with the opposite fluid line.

8. A structure as set forth in claim 1 wherein said valve means includes a series of interior ports in said block opening against said crank pin and each communicating with the inner end of a member of said one of said series of piston and cylinder members, and wherein said valve means also includes a fluid inlet passage and a fluid exhaust passage in said crank pin alternately brought into communication with each of said interior ports as said crank shaft rotates.

9. A strucfure as set forth in claim 1 wherein said one of said other series of piston and cylinder members is directly pivoted at its outer end to said support.

10. A structure as set forth in claim 1 wherein said support is in the form of a fluid tight housing in which said shackles and the crank and crank pin of said crank shaft are housed, wherein said housing has an extension extending radially with reference to said crank shaft, and wherein said one of said other series of piston and cylinder members is directly pivoted at its outer end to the outer end of said extension.

References Cited in the file of this patent

UNITED STATES PATENTS

| | | |
|---|---|---|
| 18,718 | Barden | Nov. 24, 1857 |
| 1,133,980 | Livingston | Mar. 30, 1915 |
| 1,144,385 | Schneider | June 29, 1915 |
| 1,940,957 | Larsh | Dec. 26, 1933 |
| 2,297,707 | Joy | Oct. 6, 1942 |
| 2,507,361 | Widmer | May 9, 1950 |
| 2,675,763 | Muller | Apr. 20, 1954 |
| 2,679,210 | Muller | May 25, 1954 |